US011837050B2

(12) United States Patent
Huke et al.

(10) Patent No.: US 11,837,050 B2
(45) Date of Patent: Dec. 5, 2023

(54) IN-PLAY WAGERING FOR POOLED PRIZES BY POINTS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/398,338

(22) Filed: Aug. 10, 2021

(65) Prior Publication Data

US 2022/0139164 A1 May 5, 2022

Related U.S. Application Data

(60) Provisional application No. 63/109,985, filed on Nov. 5, 2020.

(51) Int. Cl.

*A63F 9/24* (2006.01)
*A63F 11/00* (2006.01)
*G06F 13/00* (2006.01)
*G06F 17/00* (2019.01)
*G07F 17/32* (2006.01)
*G06Q 50/34* (2012.01)

(52) U.S. Cl.

CPC ......... *G07F 17/3258* (2013.01); *G06Q 50/34* (2013.01); *G07F 17/3239* (2013.01); *G07F 17/3276* (2013.01); *G07F 17/3288* (2013.01)

(58) Field of Classification Search

CPC ...................................................... G07F 17/32
USPC ............................. 463/1, 20, 22, 25, 26, 27
See application file for complete search history.

(56) References Cited

U.S. PATENT DOCUMENTS

| | | | |
|---|---|---|---|
| 9,005,016 | B2 | 4/2015 | Amaitis et al. |
| 9,033,781 | B2 | 5/2015 | Steir et al. |
| 2017/0223415 | A1 | 8/2017 | Jeon |
| 2019/0030435 | A1 | 1/2019 | Dishman |
| 2020/0282314 | A1 | 9/2020 | Szeklinski et al. |

OTHER PUBLICATIONS

International Search Report and Written Opinion dated Jan. 26, 2022 in corresponding International Patent Application No. PCT/US2021/057689; 12 pages.

*Primary Examiner* — Adetokunbo O Torimiro
(74) *Attorney, Agent, or Firm* — Maier & Maier, PLLC

(57) ABSTRACT

The present disclosure provides a method of in-play wagering for pooled or contest prizes by points in which users are placed in various cohorts based on skill and then allowed to compete against one another in a contest for a prize that is won by the user with the total amount of points earned during a contest. This method provides grouping the users of a wagering network into cohorts and allowing the users to join a contest based on the cohort to compete for a prize that the user with the most points wins during the length of the contest.

18 Claims, 7 Drawing Sheets

| Cohort | Requirement |
|---|---|
| 1 | User Places 5-20 Wagers a Week |
| 2 | User Places 21-49 Wagers a Week |
| 3 | User Places 50+ Wagers a Week |
| - | - |
| - | - |
| - | - |

FIG. 6

| User ID | Total Points |
|---|---|
| JS123456 | 150 |
| PL098765 | 125 |
| TE345678 | 105 |
| - | - |
| - | - |
| - | - |

FIG. 7

IN-PLAY WAGERING FOR POOLED PRIZES BY POINTS

FIELD

The present embodiments are generally related to play by play wagering on live sporting events

BACKGROUND

While playing on a wagering network or wagering application, it is difficult to join contests, tournaments, or pools with other players or users of the same skillset.

Also, there is no method to award users for making wagers less likely to happen in a pool or contest with other players.

Lastly, it is difficult to break up a wagering network's users into various cohorts or groups based on skill or how often the users may play on the wagering network.

SUMMARY

Methods, systems and apparatuses for wagering and pooled prizes may be shown and described. In one embodiment, a method for offering pooled prizes by points in a play-by-play wagering network can include storing play-by-play wagers made during a live sporting event on a sports wagering network; identifying users based on wagering devices used by the users to make the play-by-play wagers on the sports wagering network; grouping at least two users into a cohort on the sports wagering network; creating a contest for the cohort on the sports wagering network; assigning at least one of the at least two users in the cohort joining a contest; assigning a point value to each wager; adding the point value of each wager to the point total of a user if the user wins the wager; determining the number of points for each of the users in the cohort after a wager is won or lost; storing a user ID and points associated with each user in the contest; and awarding a prize to the user with the most points in the cohort.

In another embodiment, a system for offering pooled prizes by points in a play-by-play wagering network may include a live sporting event upon which play-by-play wagers can be placed on a sports wagering network; two or more user devices for placing wagers, the two or more user devices associated with two or more individual users and the sports betting network communicatively coupled with the two or more user devices; a cohort module which groups at least two of the two or more users into a cohort of the sports wagering network; a contest module which creates a contest for the cohort on the sports wagering network and facilitates at least one of the at least two users in the cohort to join a contest; and a prize module which provides an initial point total to each of the two or more user devices associated with individual users, assigns a point value to each wager, adds the point value to the point total of the user device if the wager is won, and awards a prize to the user with the most points in the cohort; and a contest database which stores a user ID associated with each user in the contest and the number of points for each user.

BRIEF DESCRIPTIONS OF THE DRAWINGS

The accompanying drawings illustrate various embodiments of systems, methods, and various other aspects of the embodiments. Any person with ordinary skill in the art will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 6 illustrates a cohort database, according to an embodiment.

FIG. 7 illustrates a contest database, according to an embodiment.

DETAILED DESCRIPTION

Figure 1:
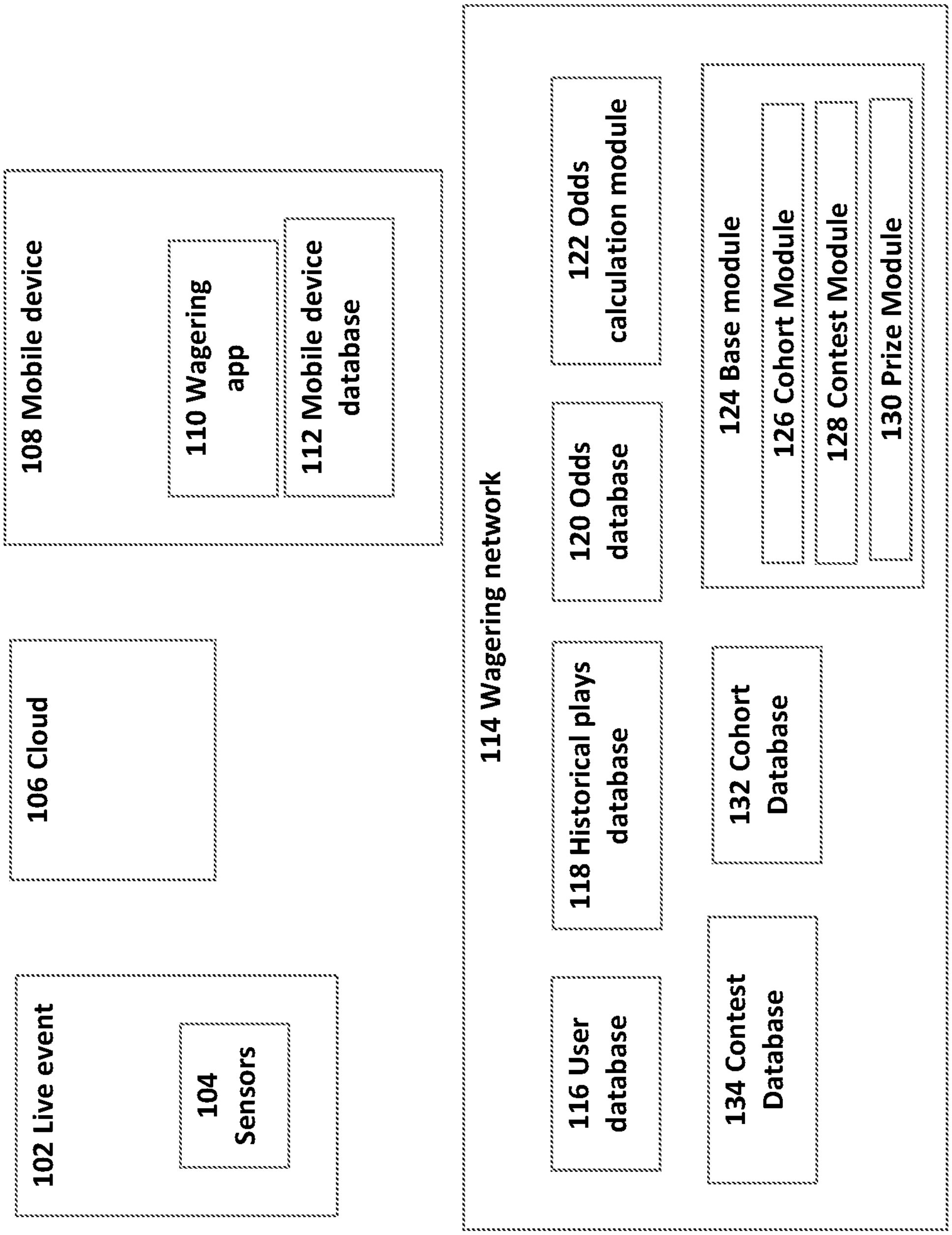
FIG. 1 illustrates a system for in-play wagering for contest prizes by points, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance, or illustration. The embodiments described herein are not limiting but rather are exemplary only. The described embodiments are not necessarily to be construed as preferred or advantageous over other embodiments. Moreover, the terms embodiments of the invention, embodiments, or invention do not require that all embodiments of the invention include the discussed feature, advantage, or mode of operation.

Further, many of the embodiments described herein are described in terms of sequences of actions performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, and/or hit performed by a participant in a sporting event. In some embodiments, an action may be a strategic decision made by a participant in the sporting event, such as a player, coach, management, etc. In some embodiments, an action may be a penalty, foul, or type of infraction occurring in a sporting event. In some embodiments, an action may include the participants of the sporting event. In some embodiments, an action may include beginning events of sporting events, for example, opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity based on the outcome of a future event, such as the results of a game or event. It may be understood that non-monetary items may be the subject of a "bet" or "wager" as well, such as points or anything else that can be quantified for a "bet" or "wager." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be made for a certain amount or future time. A "bet" or "wager" can be made for being able to answer a question correctly. A "bet" or "wager" can be made within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to a set of both implicit and explicit rules, in an electronically powered domain to place bets on the outcome of a sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example, up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to as "chalk eaters" (often a derogatory term). An event or game in which the sportsbook has reduced its betting limits, usually because of weather or the uncertain status of injured players, is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides," "favorite," "chalk," "circled game," "laying the points price," "dog," and "underdog" can be integrated into the embodiments in a variety of manners.

The "money line" refers to the odds expressed in terms of money. With money odds, whenever there is a minus (−), the player "lays" or is "laying" that amount to win (for example, $100); where there is a plus (+), the player wins that amount for every $100 wagered. A "straight bet" refers to an individual wager on a game or event that a point spread or money line will determine. The term "straight-up" means winning the game without any regard to the "point spread"; a "money-line" bet. "Money line," "straight bet," and "straight-up" can be integrated into the embodiments in a variety of manners.

The "line" refers to the current odds or point spread on a particular event or game. The "point spread" refers to the margin of points by which the favored team must win an event to "cover the spread." To "cover" means winning by more than the "point spread." A handicap of the "point spread" value is given to the favorite team so bettors can choose sides at equal odds. "Cover the spread" means that a favorite wins an event with the handicap considered, or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread." The "opening line" means the earliest line posted for a particular sporting event or game. The term "pick" or "pick 'em" refers to a game when neither team is favored in an event or game. "Line," "cover the spread," "cover," "tie," "pick," and "pick-em" can be integrated into the embodiments in a variety of manners.

To "middle" means to win both sides of a game, wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to a set of both implicit and explicit rules in an electronically powered domain for the purpose of recreation or instruction. "eSports" refers to a form of sports competition using video games or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. The event can be integrated into the embodiments in a variety of manners.

The "total" is the combined number of runs, points, or goals scored by both teams during the game, including overtime. The "over" refers to a sports bet in which the player wagers that the combined point total of two teams will be more than a specified total. The "under" refers to bets that the total points scored by two teams will be less than a certain figure. "Total," "over," and "under" can be integrated into the embodiments in a variety of manners.

A "parlay" is a single bet that links together two or more wagers; to win the bet, the player must win all the wagers in the "parlay." If the player loses one wager, the player loses the entire bet. However, if they win all the wagers in the "parlay," the player receives a higher payoff than if the player had placed the bets separately. A "round robin" is a series of parlays. A "teaser" is a type of parlay in which each individual play's point spread or total play is adjusted. The price of moving the point spread (teasing) is lower payoff odds on winning wagers. "Parlay," "round-robin," "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games, and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds posted well in advance on the winner of major events. Typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" are specific to a baseball bet placed only if both pitchers are scheduled to start a game start. If they don't, the bet is deemed "no action" and refunded. The "run line" in baseball refers to a spread used instead of the money line. "Listed pitchers," "no action," and "run line" can be integrated into the embodiments in a variety of manners.

The term "handle" refers to the total amount of bets taken. The term "hold" refers to the percentage of the house wins. The term "juice" refers to the bookmaker's commission, most commonly the 11 to 10 bettors lay on a straight point spread wagers: also known as "vigorish" or "vig." The "limit" refers to the maximum amount accepted by the house before the odds and point spread are changed. "Off the board" refers to a game in which no bets are being accepted. "Handle," "juice," vigorish," "vig," and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations, or individuals that would deploy, for fees, and may be part of, or perform, various system elements or method steps in the embodiments.

Managed service user interface service is a service that can help customers (1) manage third parties, (2) develop the web, (3) perform data analytics, (4) connect thru application program interfaces and (4) track and report on player behaviors. A managed service user interface can be integrated into the embodiments in a variety of manners.

Managed service risk management services are services that assist customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) landbased, on-property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for the integration of global and local payment methods. These payment processing services can be integrated into the embodiments in a variety of manners.

Engaging promotions allow customers to treat your players to free bets, odds boosts, enhanced access, and flexible cashback to boost lifetime value. Engaging promotions can be integrated into the embodiments in a variety of manners.

"Cash out" or "payout" or "payout" allow customers to make available, on singles bets or accumulated bets with a partial cash-out where each operator can control payouts by always managing commission and availability. The "cash-out" or "payout" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers manage sports gaming. Business Applications can be integrated into the embodiments in a variety of manners.

State-based integration allows for a given sports gambling game to be modified by states in the United States or other countries, based upon the state the player is in, mobile phone, or other geolocation identification means. State-based integration can be integrated into the embodiments in a variety of manners.

Game Configurator allows for the configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery method and licensing in which software is accessed online via a subscription rather than bought and installed on individual computers. Software as a service can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a database of reference fingerprints, wherein each reference fingerprint corresponds to a known recorded work. A database may contain metadata about the work and associated information, including complementary media. If the media clip's fingerprint is matched, the identification software returns the corresponding metadata to the client application. For example, during an in-play sports game, a "fumble" could be recognized, and at the time stamp of the event, metadata such as "fumble" could be displayed. Automatic content recognition (ACR) can be integrated into the embodiments in a variety of manners.

Joining social media means connecting an in-play sports game bet or result to a social media connection, such as FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real-time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for in-play wagering for contest prizes by points. This system may include a live event 102, for example, a sporting event such as a football, basketball, baseball, or hockey game, tennis match, golf tournament, eSports or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, the underdog or longshot. Betting on all favorites is referred to as chalk and is typically applied to a round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the amount of wagers they can take on either side of a bet before moving the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point, spreads to the middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers, which can be done at kiosks at the live event 102 or another location.

Further, embodiments may include a plurality of sensors 104 that may be used such as motion, temperature, or humidity sensors, optical sensors, and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play, and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expanding computer infrastructure and maintenance resources. Cloud 106 may be communicatively coupled to a peer-to-peer wagering network 114, which may perform real-time analysis on the type of play and the result of the play. Cloud 106 may also be synchronized with game situational data such as the time of the game, the score, location on the field, weather conditions, and the like, which may affect the choice of play utilized. For example, in an exemplary embodiment, cloud 106 may not receive data gathered from the sensors 104 and may, instead, receive data from an alternative data feed, such as Sports Radar®. This data may be compiled substantially immediately following the completion of any play. They may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include, but are not limited to keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide-semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to video displays, graphical displays, speakers, headphones, inkjet printers, laser printers, or 3D printers. Devices may include but are not limited to a combination of multiple inputs or output devices such as Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs, including, but not limited to, Microsoft KINECT, SIRI for iPhone by Apple, Google Now, or Google Voice Search. Additional user devices have both input and output capabilities, including, but not limited to, haptic feedback devices, touchscreen displays, or multi-touch displays. Touchscreen, multi-touch displays, touchpads, touch mice, or other touch sensing devices may use different technologies to sense touch, including but not limited to capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows users to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play. They may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include, but is not limited to, a plurality of betting attributes such as at least one of the following: the live event 102, a team, a player, an amount of wager, etc. The user database 116 may include but is not limited to information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120 that contains the odds calculated by an odds calculation module 122 to display the odds on the user's mobile device 108 and take bets from the user through the mobile device wagering app 110.

Further, embodiments may include the odds calculation module 122, which utilizes historical play data to calculate odds for in-play wagers.

Further, embodiments may include a base module 124, which initiates the cohort module 126, the contest module 128, and the prize module 130.

Further, embodiments may include the cohort module 126, which may be initiated by the base module 124. The cohort module 126 may extract the first user wagering history in the user database 116. For example, the user database 116 may contain the user ID, a device identifier, a paired device identifier, wagering history, or wallet information for the user. The cohort module 126 may then compare the extracted user wager history to a cohort database 132. For example, if the user places ten wagers per week, the user may be placed in cohort 1 since the requirement for cohort 1 is that a user places between 5 and 20 wagers a week. The cohort module 126 may extract the corresponding cohort from the cohort database 132. For example, cohort module 126 may extract the cohort number, such as 1, from the cohort database 132. The cohort module 126 may then store the extracted cohort in the user database 116. For example, cohort module 126 may store cohort 1 in the user database 116. The cohort module 126 may then determine if more users remain in the user database 116. For example, the cohort module 126 may go through each user in the user database 116 and give a cohort to each user. If there are additional users in the user database 116, the cohort module 126 may then extract the next user's wagering history from the user database 116. The process may then return to comparing the wagering history with the cohort database 132. If there are no remaining users in the user database 116, the cohort module 126 may then return to the base module 124.

Further, embodiments may include the contest module 128, which may begin with the base module 124 initiating the contest module 128. The wagering network 114 may then create a contest. For example, the wagering network 114 may create a contest allowing users of the same cohort to participate against one another during the live event 102, a series of live events 102, live events 102 for a certain time such as hour, day or days, week or weeks, month or months, etc. In some embodiments, the contest may be for users within a certain city, state, region, or other geographical requirements. In some embodiments, the contest may be for fans of certain teams, sports, etc. In some embodiments, a user may be able to invite other users to the contest. In some embodiments, the contest may be advertised with a prize such as free credits, merchandise or swag, travel or vacation prizes, etc. In some embodiments, the contest may require a certain number of players play or a maximum number of players allowed in the contest. In some embodiments, a user may receive an offer to join the contest through the wagering app 110. A user may request to join the contest on their wagering app 110. The user may be approved if they meet the cohort requirements for the contest. For example, the contest module 128 may filter the user database 116 for the requesting user ID and extract the user's cohort number, such as 1, and determine if the cohort number matches the cohort requirement for the contest. The cohort number may allow users to compete in a contest with users of similar skill or expertise. If the user meets the cohort requirements for the contest, the contest module 128 may then allow the user to join the contest. For example, the user may receive a notification that they have been approved or have joined the contest. The contest module 128 may then store the user data in a contest database 134. For example, contest module 128 may store the user ID, such as JS123456, in the contest database 134. If the user does not meet the cohort requirements for the contest, the contest module 128 may then deny the user's request to join the contest. For example, the user may receive a notification that informs them that they were rejected from joining or are not allowed to join the contest. The contest module 128 may then determine if another user has requested to join the contest. If another user requested to join the contest, then the process may return to check that the user meets the cohort requirements for the contest. If no other user requests to join the contest, the contest module 128 may then return to the base module 124.

Further, embodiments may include the prize module 130, which is initiated by the base module 124. The prize module 130 may continuously poll for the contest to end. For example, a contest may end at the completion of a live event 102 such as the Boston Red Sox vs. New York Yankees game. In some embodiments, the contest may end at the finish of a series of live events 102. In some embodiments, the contest may end after a certain time, such as hour, day or days, week or weeks, month or months, etc. The contest may then end. The prize module 130 may then extract the first user ID from the contest database 134. For example, the user ID JS123456 may be extracted from the contest database 134. The prize module 130 may then filter the user database 116 for the extracted user ID. For example, the user database 116 may be filtered for the user ID JS123456's wagering history. The prize module 130 may then filter the user database 116 for the contest parameters. For example, the user database 116 may be filtered for the live event 102, series of live events 102, time that the contest was active for, etc. Further, if the contest were for the live event 102, such as the Boston Red Sox vs. New York Yankees game on June 14th, the user database 116 may be filtered for wagers that only occurred on June 14th, for the Boston Red Sox vs. New York Yankees game. The same logic would apply if, for example, the contest was for all baseball events for the week of May 23rd through May 30th. The user database 116 may be filtered for the baseball wagers from May 23rd to May 30th and the user's wagering history for the contest. The prize module 130 may determine the user's total amount of points. For example, the user database 116 may be filtered for the wagering history that applies to the contest allowing the prize module 130 to count the user's points. For example, a user may earn points by selecting wagers with different odds, such as 1:1, 2:1, 3:1, etc., and is awarded the points if the wager is won. In another example, if the user selected that a batter would hit a home run during the current at-bat with 6:1 odds and the batter hits a home run, the user may be awarded 6 points. Further, if a user selected that a pitcher would throw a strike on the first pitch of an at-bat at 2:1 odds and the first pitch is a strike, then the user may be awarded 2 points. In some embodiments, the user may lose points for losing a selected wager. In some embodiments, the users may have a certain number of points to use during the contest, such as 100 points. In some embodiments, the user may wager a monetary value and receive a monetary value for winning the wager in addition to receiving points for the contest. The prize module 130 may store the user's total amount of points in the contest database 134. For example, the prize module 130 may store the extracted 150 points in the contest database 134 for the user with the ID JS123456. The prize module 130 may determine if users remain in the contest database 134. If so, the prize module 130 may extract the next user ID, and may return to filtering the user database 116 for the extracted user ID. If there are no remaining users in the contest database 130, the prize module 130 may sort the contest database 134 for user ID with the most points. For example, the prize module 130 may sort the contest database 134 by total points from highest to the lowest amount to determine which user won the contest. The prize module 130 may extract the user-ID with the most points. For example, if the user with the ID JS123456 had the most points at 150, the prize module 130 may extract it from the contest database 134. The prize module 130 may send the prize to the extracted user ID. For example, the prize for the contest, such as free credits, merchandise or swag, travel or vacation prizes, etc., may be sent to the user-ID with the most points. For example, the prize module 130 may send the user with the ID JS123456 the prize of $25 credits for winning the contest. The prize module 130 may return to the base module 124.

Further, embodiments may include the cohort database 132, which may contain the cohort number, such as 1, 2, 3, etc. as well as the cohort's requirement for users to join, such as the user places 5-20 wagers a week, the user places 21-49 wagers a week, or the user places 50 or more wagers a week. The cohort database 132 may be used in the process described above for the cohort module 126 to place users in cohorts representative of their skill level for the wagering app 110. In some embodiments, the cohort database 132 requirements may use historical wagering patterns for a day, week, month, year, etc. In some embodiments, the cohort database 132 requirements may be based on a monetary value, such as the more money spent by a user, the higher the cohort.

Further, embodiments may include the contest database 134, which may contain the user IDs for the contest, such as JS123456, and the user's total amount of points, such as 150. The contest database 134 may be used in the process described above for the contest module 128 to store user IDs included in the contest and in the process described in the prize module 130 to determine and store the total amount of points for each user in the contest. In some embodiments, the contest database 134 may include the contest parameters such as the live event 102, the series of live events 102, the live events 102 for a certain time such as hour, day or days, week or weeks, month or months, etc. In some embodiments, the contest database 134 may include the geographical requirements for the contest, such as users within a certain city, state, region, or other geographical requirements. In some embodiments, the contest database 134 may include the prize such as free credits, merchandise or swag, travel or vacation prizes, etc. In some embodiments, the contest database 134 may include the minimum or the maximum number of entries for the contest and either the total number of entries for the contest or the total number of entries for each user.

Figure 2:
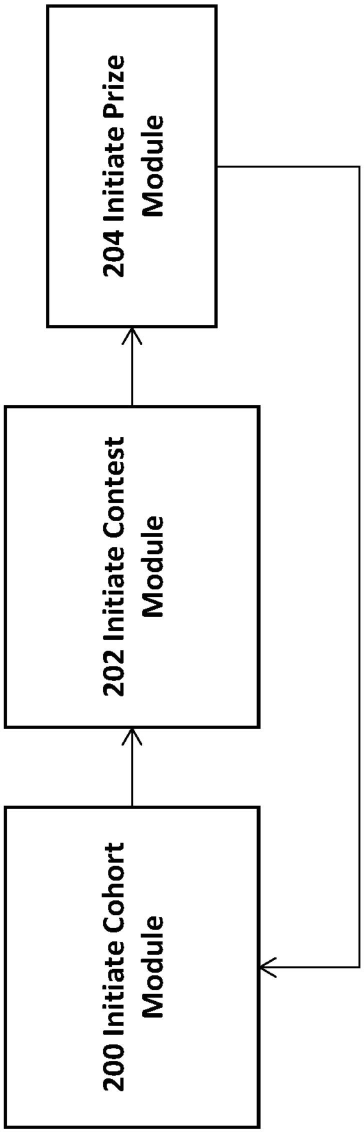
FIG. 2 illustrates a base module, according to an embodiment.

FIG. 2 illustrates the base module 124. The process may begin with the base module initiating, at step 200, the cohort module 126. For example, the cohort module 126 may extract the first user wagering history from the user database 116 which may contain the user ID, a device identifier, a paired device identifier, wagering history, or wallet information for the user. The cohort module 126 may compare the extracted user wager history to cohort database 132. For example, if the user places ten wagers per week, the user may be placed in cohort 1 since the requirement for cohort 1 is that a user places between 5 and 20 wagers a week. The cohort module 126 may extract the corresponding cohort number. For example, the cohort module 126 may extract the cohort number, such as cohort 1, from the cohort database 132. The cohort module 126 may store the extracted cohort number in the user database 116. For example, the cohort module 126 may store cohort 1 in the user database 116. The cohort module 126 may determine if users remain in the user database 116. For example, the cohort module 126 may go through each user in the user database 116 and give a cohort number to each user. If users remain in the user database 116, the cohort module 126 may extract the next user's wagering history from the user database 116. The process may return to comparing the wagering history with the cohort database 132. If no users remain in the user database 116, the cohort module 126 may return to the base module 124. The base module 124 may initiate, at step 202, the contest module 128. For example, the wagering network 114 may create a contest allowing users of the same cohort to participate against one another during a live event 102, a series of live events 102, live events 102 for a certain time, such as hour, day or days, week or weeks, month or months, etc. In some embodiments, the contest may be for users within a certain city, state, region, or other geographical requirements. In some embodiments, the contest may be for fans of certain teams, sports, etc. In some embodiments, a user may be able to invite other users to the contest. In some embodiments, the contest may be advertised with a prize such as free credits, merchandise or swag, travel or vacation prizes, etc. In some embodiments, the contest may have a certain number of players required to play or the maximum number of players allowed in the contest. In some embodiments, a user may receive an offer to join the contest through the wagering app 110. A user may request to join the contest. For example, the user may select to join the contest on their wagering app 110. The contest module 128 may determine if the user meets the cohort requirements for the contest. For example, the contest module 128 may filter the user database 116 for the requesting user's ID, extract the user's cohort number, such as 1, and determine if that cohort number matches the cohort requirement for the contest. The cohort number may allow users to compete in a contest with users of similar skill or expertise. If the user meets the cohort requirements for the contest, the contest module 128 may allow the user to join the contest. For example, the user may receive a notification that they have been approved to join or have joined the contest. The contest module 128 may store the user data in the contest database 134. For example, the contest module 128 may stores the user ID, such as JS123456, in the contest database 134. If the user does not meet the cohort requirements for the contest, the contest module 128 may deny the user's request to join the contest. For example, the user may receive a notification that says they have been rejected from joining or are not allowed to join the contest. The contest module 128 may determine if another user has requested to join the contest. If so, the process may return to determining if the user meets the cohort requirements for the contest. If no other user requested to join the contest, the contest module 128 may return to the base module 124. The base module may initiate, at step 204, the prize module 130. For example, the prize module 130 may be initiated by the base module 124. The prize module 130 may continuously poll for the contest to end. For example, the contest may end at the completion of a live event 102 such as the Boston Red Sox vs. New York Yankees game. In some embodiments, the contest may end at the finish of a series of live events 102. In some embodiments, the contest may end after a certain time, such as hour, day or days, week or weeks, month or months, etc. The contest may end. For example, the contest may end at the finish of a live event 102 such as the Boston Red Sox vs. New York Yankees game. In some embodiments, the contest may end at the finish of a series of live events 102. In some embodiments, the contest may end after a certain time, such as hour, day or days, week or weeks, month or months, etc. The prize module 130 may extract the first user ID from the contest database 134. For example, the prize module 130 may extract the user ID JS123456 from the contest database 134. The prize module 130 may filter the user database 116 for the extracted user ID. For example, the prize module 130 may filer the user database 116 for the user ID JS123456 and the user's wagering history. The prize module 130 may filter the user database 116 for the contest parameters. For example, the prize module 130 may filter the user database 116 for the live event 102, series of live events 102, time that the contest was active for, etc. For example, if the contest were for the live event 102, such as the Boston Red Sox vs. New York Yankees game on June 14th, the user database 116 may be filtered for wagers that only occurred on June 14th, for the live event 102, the Boston Red Sox vs. New York Yankees game. The same logic would apply if, for example, the contest was for all baseball events for the week of May 23rd through May $30^{th}$. The user database 116 may be filtered for baseball wagers from May 23rd to May 30th and the user's wagering history for the contest. The prize module 130 may determine the total amount of points for the user. For example, the user database 116 may be filtered for the wagering history that applies to the contest. The prize module 130 may count each point earned by the user. For example, a user may earn points by selecting wagers with different odds, such as 1:1, 2:1, 3:1, etc., and is awarded the points if the wager is won. For example, if the user selected that a batter would hit a home run during the current at-bat at 6:1 odds and the batter hits a home run, the user may be awarded 6 points. Also if a user-selected that a pitcher would throw a strike on the first pitch of an at-bat at 2:1 odds and the first pitch is a strike, then the user may be awarded 2 points. In some embodiments, the user may lose points for losing a selected wager. In some embodiments, the users may have a certain number of points to use during the contest, such as 100 points. In some embodiments, the user may wager a monetary value and receive a monetary value for winning the wager in addition to receiving points for the contest. The prize module 130 may store the total amount of points for the user in the contest database 134. For example, the prize module 130 may store the extracted 150 points in the contest database 134 for the user with the ID JS123456. The prize module 130 may determine if users remain in the contest database 134. If so, the prize module 130 may extract the next user ID and return to filtering the user database 116 for the extracted user ID. If no users remain in the contest database 130, the prize module 130 may sort the contest database 134 for the most points. For example, the prize module 130 may sort the contest database 134 by total amount of points from highest to lowest to determine which user won the contest. The prize module 130 may extract the user-ID with the most points. For example, the prize module 130 may extract from the contest database 314 the user ID JS123456 because it has the most points at 150. The prize module 130 may send the prize to the extracted user ID. For example, the prize for the contest, such as free credits, merchandise or swag, travel or vacation prizes, etc., may be sent to the user-ID with the most points. For example, the prize module 130 may send the user with the ID JS123456 the prize of $25 credits for winning the contest. The prize module 130 may return to the base module 124. The base module 124 may then return to step 200.

Figure 3:
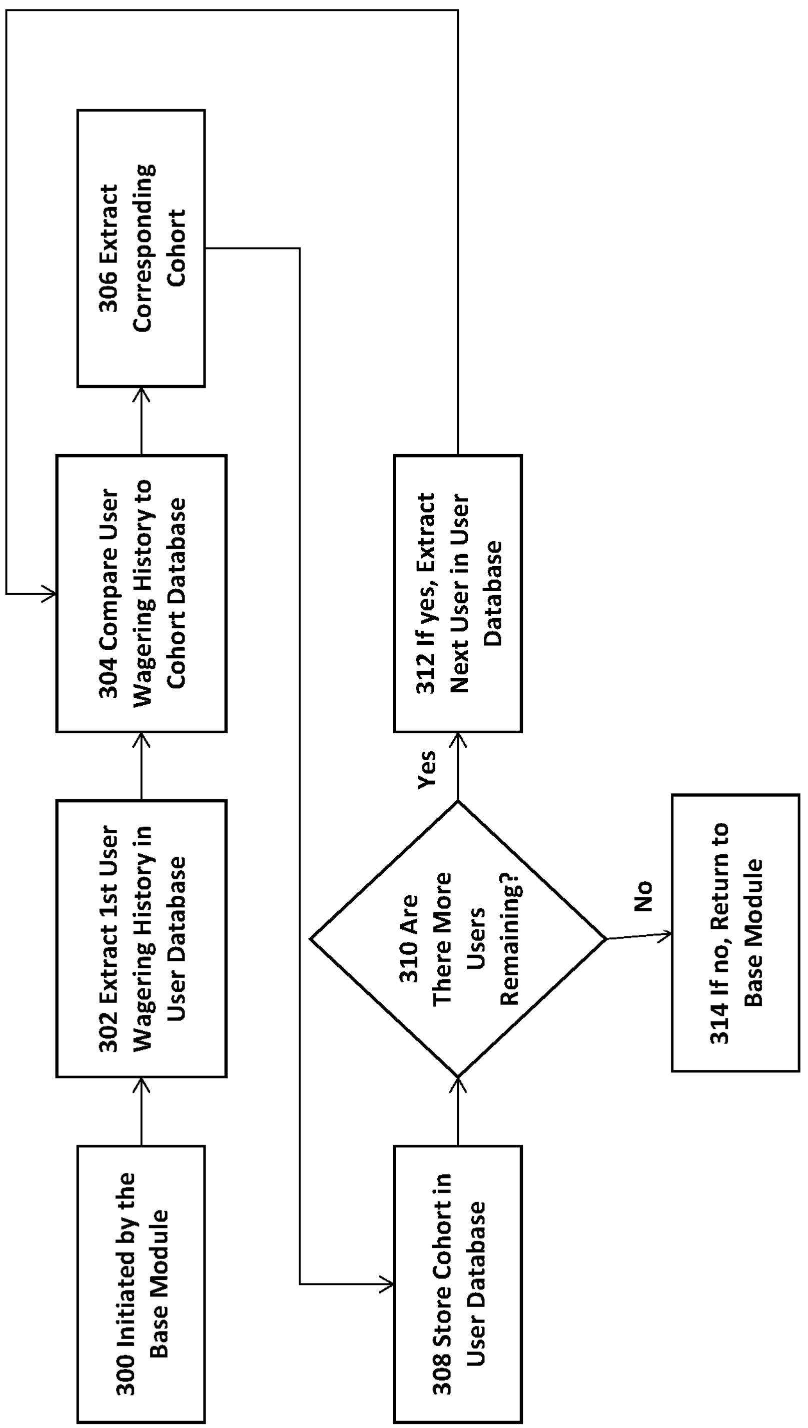
FIG. 3 illustrates a cohort module, according to an embodiment.

FIG. 3 illustrates the cohort module 126. The process may begin with cohort module 126 being initiated, at step 300, by the base module 124. The cohort module 126 may extract, at step 302, the first user's wagering history from the user database 116 which may also contain the user ID, a device identifier, a paired device identifier, wagering history, or wallet information for the user. The cohort module 126 may compare, at step 304, the extracted user's wager history to the cohort database 132. For example, if the user places ten wagers per week, the user may be placed in cohort 1 since the requirement for cohort 1 is that a user places between 5 and 20 wagers a week.

Another example may be if the user places 30 wagers a week, then the user may be placed in cohort 2 since the requirement for cohort 2 is that a user places between 21 and 49 wagers per week. The cohort module 126 may extract, at step 306, the corresponding cohort number from the cohort database 132. For example, the cohort module 126 may extract the cohort number, such as 1, from the cohort database 132. The cohort module 126 may store, at step 308, the extracted cohort in the user database 116. For example, the cohort module 126 may store cohort 1 in the user database 116. The cohort module 126 may determine, at step 310, if users remain in the user database 116. For example, the cohort module 126 may go through each user in the user database 116 and give a cohort number to each user. If users remain in the user database 116, the cohort module may extract, at step 312, the next users wagering history in the user database 116. The process may then return to step 304. If no users remain in the user database 116, the cohort module 126 may return, at step 314, to the base module 124.

Figure 4:
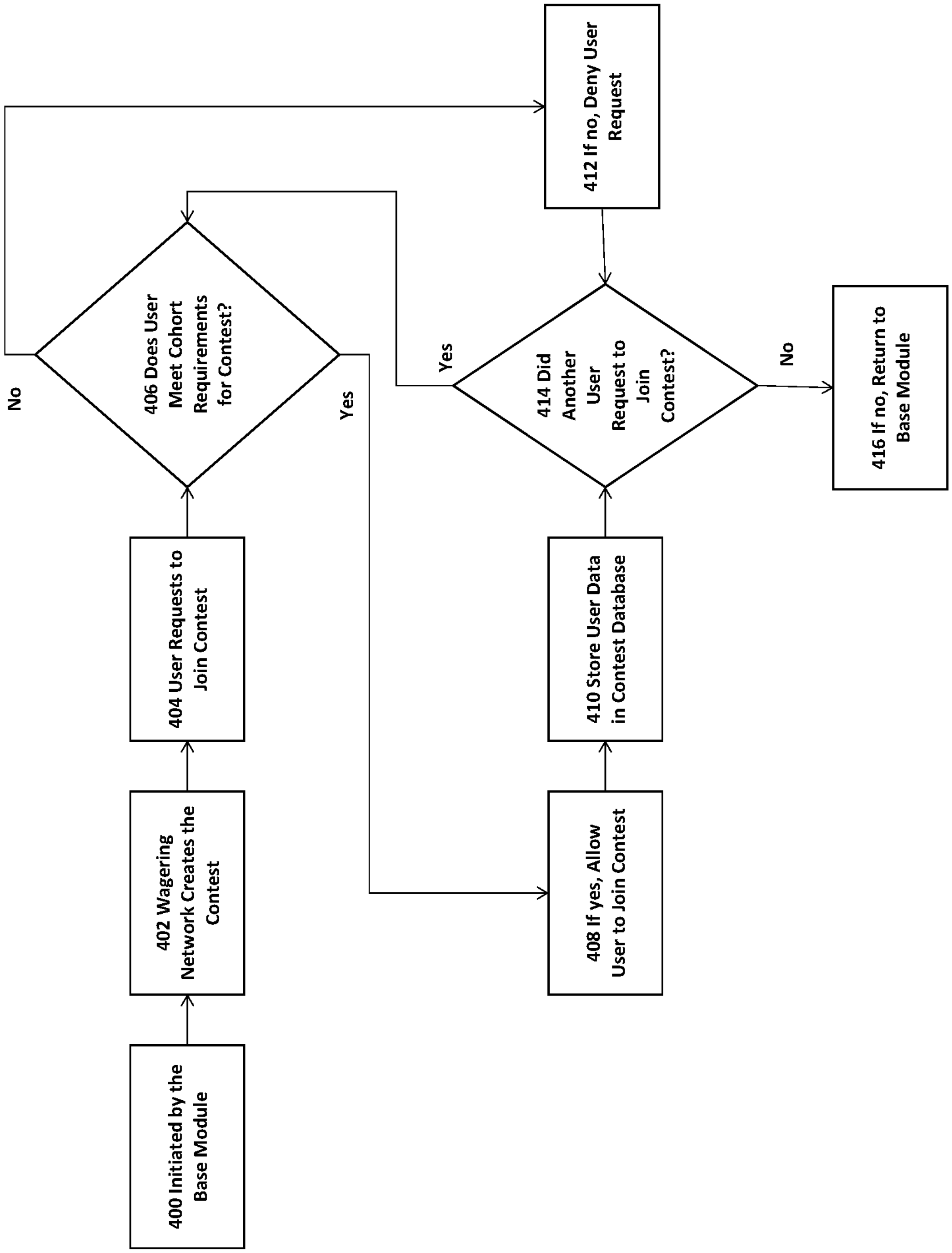
FIG. 4 illustrates a contest module, according to an embodiment.

FIG. 4 illustrates the contest module 128. The process may begin with the base module 124 initiating, at step 400, the contest module 128. The wagering network 114 may create, at step 402, a contest. For example, the wagering network 114 may create a contest allowing users of the same cohort to participate against one another during a live event 102, a series of live events 102, live events 102 for a certain time such as hour, day or days, week or weeks, month or months, etc. In some embodiments, the contest may be for users within a certain city, state, region, or other geographical requirements. In some embodiments, the contest may be for fans of certain teams, sports, etc. In some embodiments, a user may be able to invite other users to the contest. In some embodiments, the contest may be advertised with a prize such as free credits, merchandise or swag, travel or vacation prizes, etc. In some embodiments, the contest may have a certain number of players required to play or list the maximum number of players allowed in the contest. In some embodiments, a user may receive an offer to join the contest through the wagering app 110. A user may request, at step 404, to join the contest on their wagering app 110. The contest module 128 may determine, at step 406, if the user meets the cohort requirements for the contest. For example, the contest module 128 may filter the user database 116 for the requesting user ID and extract the user's cohort number, such as 1, and determine if the cohort number matches the cohort requirement for the contest. The cohort number may allow users to compete in a contest with users of similar skill or expertise. If the user does not meet the cohort requirements for the contest, the contest module 128 may skip to step 412. If the user meets the cohort requirements for the contest, the contest module 128 may allow, at step 408, the user to join the contest. For example, the user may receive a notification that they have been approved to join or have joined the contest. The contest module 128 may store, at step 410, the user's data in the contest database 134. For example, contest module 128 may store the user ID, such as JS123456, in the contest database 134. If the user does not meet the cohort requirements for the contest, the contest module 128 may deny, at step 412, the user's request to join the contest. For example, the user may receive a notification that they have been rejected from joining or not allowed to join the contest. The contest module 128 may determine, at step 414, if another user requested to join the contest. If so, the process may return to step 406. If no other user requested to join the contest, the contest module 128 may return, at step 416, to the base module 124.

Figure 5:
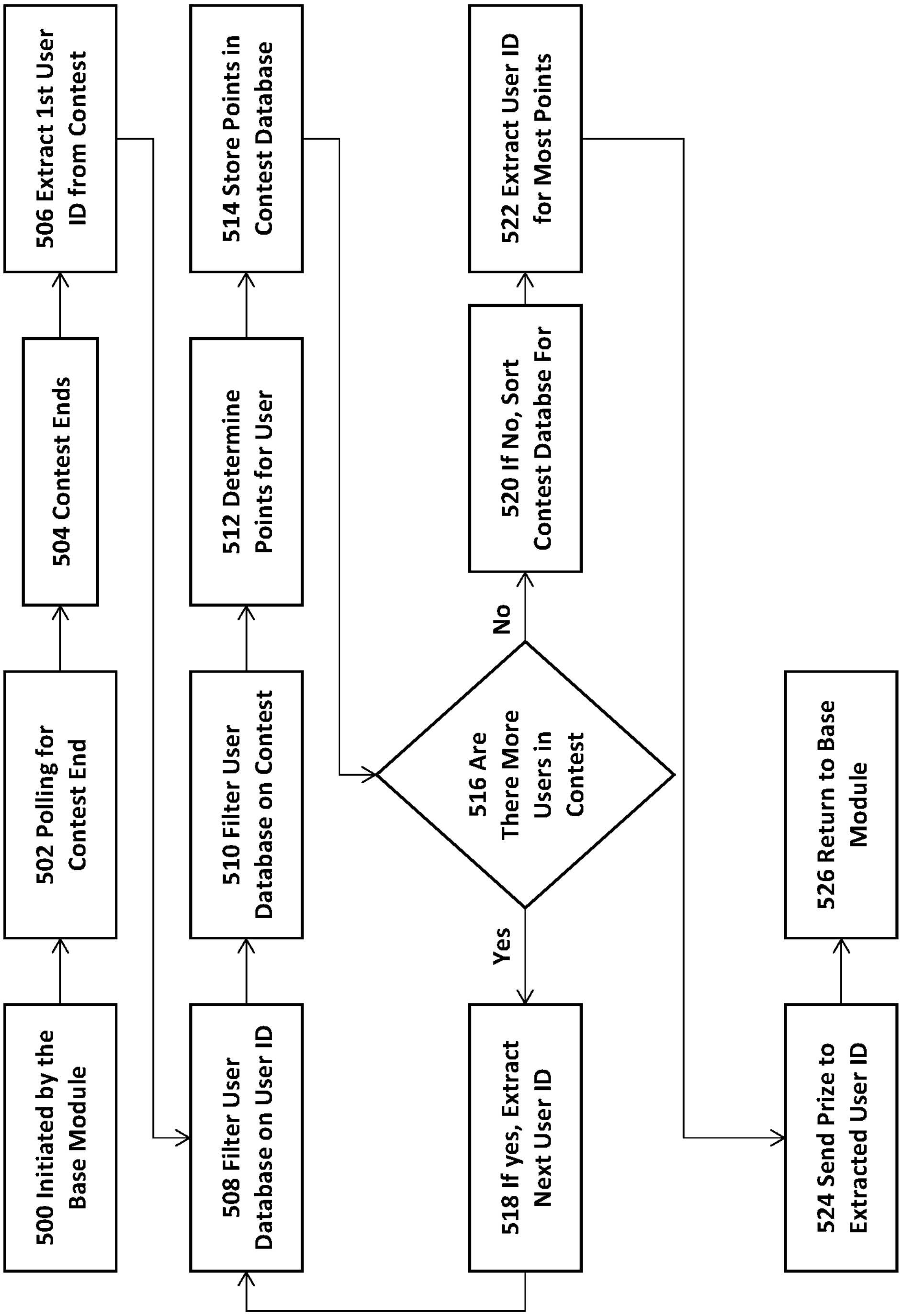
FIG. 5 illustrates a prize module, according to an embodiment.

FIG. 5 illustrates the prize module 130. The process may begin with the base module 124 initiating, at step 500, the prize module 130. The prize module 130 may continuous poll, at step 502, for the contest to end. For example, the contest may end at the finish of a live event 102 such as the Boston Red Sox vs. New York Yankees game. In some embodiments, the contest may end at the finish of a series of live events 102. In some embodiments, the contest may end after a certain time, such as hour, day or days, week or weeks, month or months, etc. The contest may end at step 504. For example, the contest may end at the finish of a live event 102 such as the Boston Red Sox vs. New York Yankees game. In some embodiments, the contest may end at the finish of a series of live events 102. In some embodiments, the contest may end after a certain time, such as hour, day or days, week or weeks, month or months, etc. The prize module 130 may extract, at step 506, the first user ID from the contest database 134. For example, the prize module 130 may extract the user ID JS123456 from the contest database 134. The prize module 130 may filter, at step 508, the user database 116 for the extracted user ID. For example, the prize module 130 may filter the user database 116 for the user ID JS123456 and the user's wagering history. The prize module 130 may filter, at step 510, the user database 116 for the contest parameters, such as, the live event 102, series of live events 102, time that the contest was active for, etc. For example, if the contest were for one live event 102, such as the Boston Red Sox vs. New York Yankees game on June 14th, the user database 116 may be filtered for wagers that only occurred on June 14th, for that live event 102, the Boston Red Sox vs. New York Yankees game. The same logic would apply if, for example, the contest was for all baseball events for the week of May 23rd through May 30th. The user database 116 may be filtered for the baseball wagers from May 23rd to May 30th and the user's wagering history for the contest. The prize module 130 may determine, at step 512, the user's total amount of points. For example, the prize module 130 may filter the user database 116 for the wagering history that applies to the contest. The prize module 130 may count each point earned by the user. For example, a user may earn points by selecting wagers with different odds, such as 1:1, 2:1, 3:1, etc., and is awarded the points if the wager is won. Further, if the user selected that a batter would hit a home run during the current at-bat at 6:1 odds and the batter hits a home run, the user may be awarded 6 points. Also, if a user-selected that a pitcher would throw a strike on the first pitch of an at-bat at 2:1 odds and the first pitch is a strike, then the user may be awarded 2 points. In some embodiments, the user may lose points for losing a selected wager. In some embodiments, the user may be provided a certain number of initial points to use during the contest, such as 100 points. In some embodiments, the user may wager a monetary value and receive a monetary value for winning the wager in addition to receiving points for the contest. The prize module 130 may store, at step 514, the user's total amount of points in the contest database 134. For example, the prize module 130 may store the extracted 150 points in the contest database 134 for the user with the ID JS123456. The prize module 130 may determine, at step 516, if more users remain in the contest database 134. If so, the prize module may extract, at step 518, the next user ID, and the process may return to step 508. If no users remain in the contest database 130, the prize module 130 may sort, at step 520, the contest database 134 for the most points. For example, the prize module 130 may sort the contest database 134 by total points from highest to lowest to determine which user won the contest. The prize module 130 may extract, at step 522, the user ID with the most points. For example, the prize module 130 may extract the user with the ID JS123456 who has the most points, at 150, from the contest database 134. The prize module 130 may send, at step 524, the prize, such as free credits, merchandise or swag, travel or vacation prizes, etc., to the user-ID with the most points. For example, the prize module 130 may send the user with the ID JS123456 the prize of $25 credits for winning the contest. The prize module 130 returns, at step 526, to the base module 124.

FIG. 6 illustrates cohort database 132. The cohort database 132 may contain the cohort number, such as cohort 1, cohort 2, cohort 3, etc. and the cohort's requirement to join for potential users, such as, the user places 5-20 wagers a week, the user places 21-49 wagers a week, or the user places 50 or more wagers a week. The cohort database 132 may be used in the process described above for the cohort module 126 to place users in cohorts representative of their skill level for the wagering app 110. In some embodiments, the cohort database 132 requirements may use historical wagering patterns for a day, week, month, year, etc. In some embodiments, the cohort database 132 requirements may be based on monetary value, such as the more money spent by a user, the higher the cohort.

FIG. 7 illustrates the contest database 134. The contest database 134 may contain the user IDs for the users in the contest, such as JS123456, and the total amount of points for the user, such as 150. The contest database 134 may be used in the process described above for the contest module 128 to store the user IDs for users included in the contest. Also, the contest database 134 may be used in the process described above for the prize module 130 to determine and store the total amount of points for each user in the contest. In some embodiments, the contest database 134 may include the contest parameters such as the live event 102, the series of live events 102, the live events 102 for certain times such as hour, day or days, week or weeks, month or months, etc. In some embodiments, the contest database 134 may include the geographical requirements for the contest, such as users within a certain city, state, region, or other geographical requirements. In some embodiments, the contest database 134 may include the prize such as free credits, merchandise or swag, travel or vacation prizes, etc. In some embodiments, the contest database 134 may include the minimum or the maximum number of entries for the contest and either the total number of entries for the contest or the total number of entries for each user.

The foregoing description and accompanying figures illustrate the principles, preferred embodiments, and modes of operation of the invention. However, the invention should not be construed as being limited to the embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for offering pooled prizes by points in a wagering network, comprising;

storing wagers made during a sporting event on a sports wagering network;

identifying users based on wagering devices used by the users to make the wagers on the sports wagering network;

creating, on the sports wagering network, a cohort, wherein creating the cohort comprises polling a wagering device of a first user for a wagering history of the first user, and assigning the first user to the cohort if the wagering history of the first user meets a first criteria;

grouping at least one second user into the cohort on the sports wagering network based on polling a wagering device of the second user for a wagering history of the second user and determining the wager history of the second user meets the first criteria;

creating a contest for the cohort on the sports wagering network;

assigning at least one of the first user and at least one second user to the contest;

assigning a point value to each wager of each user in the contest;

adding the point value of each wager to the point total of a user in the contest if the user wins the wager;

determining the number of points for each of the users in the cohort after a wager is won or lost;

storing a user ID and points associated with each user in the contest; and awarding a prize for the contest to the user with the most points in the cohort.

2. The method for offering pooled prizes by points in the wagering network of claim 1, the first criteria is that each user has placed a minimum number of bets per week.

3. The method for offering pooled prizes by points in the wagering network of claim 1, wherein at least two users are grouped into the cohort based on geographic data of the user.

4. The method for offering pooled prizes by points in the wagering network of claim 1, wherein at least two users are grouped into the cohort based on skill or expertise of betting.

5. The method for offering pooled prizes by points in the wagering network of claim 1, wherein one or more of the users in the cohort may invite other users to join the contest.

6. The method for offering pooled prizes by points in the wagering network of claim 1, wherein the contest is which user can win the most bets over a specified period of time.

7. The method for offering pooled prizes by points in the wagering network of claim 6, wherein the contest is which user can win the most bets in games within contest parameters.

8. The method for offering pooled prizes by points in the wagering network of claim 1, wherein the prize awarded is one of a cash prize, merchandise, credits for use on the wagering network, or other credit.

9. The method for offering pooled prizes by points in the wagering network of claim 1, wherein the point value is dependent on the likelihood of the wager, and the point value of the wager is subtracted from the point total of the user if the user losses the wager.

10. A system for offering pooled prizes by points in a wagering network, comprising:

a sporting event upon which wagers can be placed on a sports wagering network;

two or more user devices for placing wagers, the two or more user devices associated with two or more individual users and the sports betting network communicatively coupled with the two or more user devices;

a cohort module which creates a cohort by grouping at least two of the two or more users of the sports wagering network based on a wagering history of the at least two users meeting a first criteria;

a contest module which creates a contest for the cohort on the sports wagering network and facilitates at least one of the at least two users in the cohort to join the contest; and a prize module which provides an initial point total to each of the two or more user devices associated with individual users, assigns a point value to each wager of each user in the contest, adds the point value to the point total of the user device of a user in the contest if the wager is won, and awards a prize for the contest to the user with the most points in the cohort; and a contest database which stores a user ID associated with each user in the contest and the number of points for each user.

11. The system for offering pooled prizes by points in the wagering network of claim 10, further comprising a cohort database which stores the first criteria for users to be placed into the cohort, wherein the first criteria is that each user has placed a minimum number of bets per week.

12. The system for offering pooled prizes by points in the wagering network of claim 10, wherein the cohort module groups the at least two users into the cohort based on geographic data of the user devices associated with the at least two users.

13. The system for offering pooled prizes by points in the wagering network of claim 10, wherein the cohort module groups the at least two users into the cohort based on skill or expertise at betting of the at least two users.

14. The system for offering pooled prizes by points in the wagering network of claim 10, wherein the contest module facilitates one or more of the at least two users in the cohort to invite other users to join the contest.

15. The system for offering pooled prizes by points in the wagering network of claim 10, wherein the contest created by the contest module is which user can win the most points over a specified period of time.

16. The system for offering pooled prizes by points in the wagering network of claim 10, wherein the contest created by the contest module is which user can win the most points in games within contest parameters.

17. The system for offering pooled prizes by points in the wagering network of claim 10, wherein the prize awarded by the prize module is one of a cash prize, merchandise, credits for use on the wagering network, or other credit.

18. The system for offering pooled prizes by points in the wagering network of claim 10, wherein the point value assigned by the prize module to each wager is dependent on the likelihood of the wager, and the prize module subtracts the point value of the wager from the point total of the user if the user losses the wager.

* * * * *